(12) United States Patent
Baleine et al.

(10) Patent No.: US 9,400,217 B2
(45) Date of Patent: Jul. 26, 2016

(54) DUAL INFRARED BAND APPARATUS AND METHOD FOR THERMALLY MAPPING A COMPONENT IN A HIGH TEMPERATURE COMBUSTION ENVIRONMENT

(71) Applicant: Siemens Energy, Inc., Orlando, FL (US)

(72) Inventors: Erwan Baleine, Orlando, FL (US); Christine P. Spiegelberg, Winter Park, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/294,530

(22) Filed: Jun. 3, 2014

(65) Prior Publication Data

US 2015/0346032 A1 Dec. 3, 2015

(51) Int. Cl.
*G01N 21/85* (2006.01)
*G01J 5/00* (2006.01)
*G01J 5/10* (2006.01)
*G01J 5/08* (2006.01)
*G02B 6/42* (2006.01)
*G01J 5/04* (2006.01)
*G01J 5/60* (2006.01)
*G02B 6/36* (2006.01)
*G02B 6/10* (2006.01)

(52) U.S. Cl.
CPC ............ *G01J 5/0088* (2013.01); *G01J 5/046* (2013.01); *G01J 5/0818* (2013.01); *G01J 5/0821* (2013.01); *G01J 5/0846* (2013.01); *G01J 5/10* (2013.01); *G01J 5/602* (2013.01); *G02B 6/4215* (2013.01); *G01J 2005/0077* (2013.01); *G01J 2005/0081* (2013.01); *G01J 2005/106* (2013.01); *G02B 6/102* (2013.01); *G02B 6/3624* (2013.01)

(58) Field of Classification Search
CPC ............ G01J 5/0088; G01J 2005/0081; G01J 2005/0085; G01N 21/8507
See application file for complete search history.

(56) References Cited

U.S. PATENT DOCUMENTS

| | | | |
|---|---|---|---|
| 7,422,365 B2 | 9/2008 | Chamberlain et al. | |
| 7,690,840 B2 | 4/2010 | Zombo et al. | |
| 8,063,372 B2 | 11/2011 | Lemieux et al. | |
| 2004/0179575 A1* | 9/2004 | Markham | 374/121 |
| 2009/0312956 A1* | 12/2009 | Zombo et al. | 702/34 |
| 2010/0224772 A1* | 9/2010 | Lemieux et al. | 250/252.1 |
| 2012/0200698 A1 | 8/2012 | Baleine et al. | |
| 2014/0063227 A1 | 3/2014 | Baleine | |
| 2014/0376588 A1* | 12/2014 | Wang et al. | 374/121 |
| 2014/0376590 A1* | 12/2014 | Hwang et al. | 374/130 |

* cited by examiner

*Primary Examiner* — David Porta
*Assistant Examiner* — Hugh H Maupin

(57) ABSTRACT

Apparatus and method for thermally mapping a component in a high temperature environment. An optical probe (10) has a field of view (14) arranged to encompass a surface of a component (15) to be mapped. The probe (10) captures infrared (IR) emissions in the near or mid IR band. An optical fiber (16) has a field of view to encompass a spot location (18) on the surface of the component within the field of view (14) of the probe (12). The fiber (16) captures emissions in the long IR band. The emissions in the long IR band are indicative of an emittance value at the spot location. This information may be used to calibrate a radiance map of the component generated from the emissions in the near or mid IR band and thus map the absolute temperature of the component regardless of whether the component includes a TBC.

18 Claims, 3 Drawing Sheets

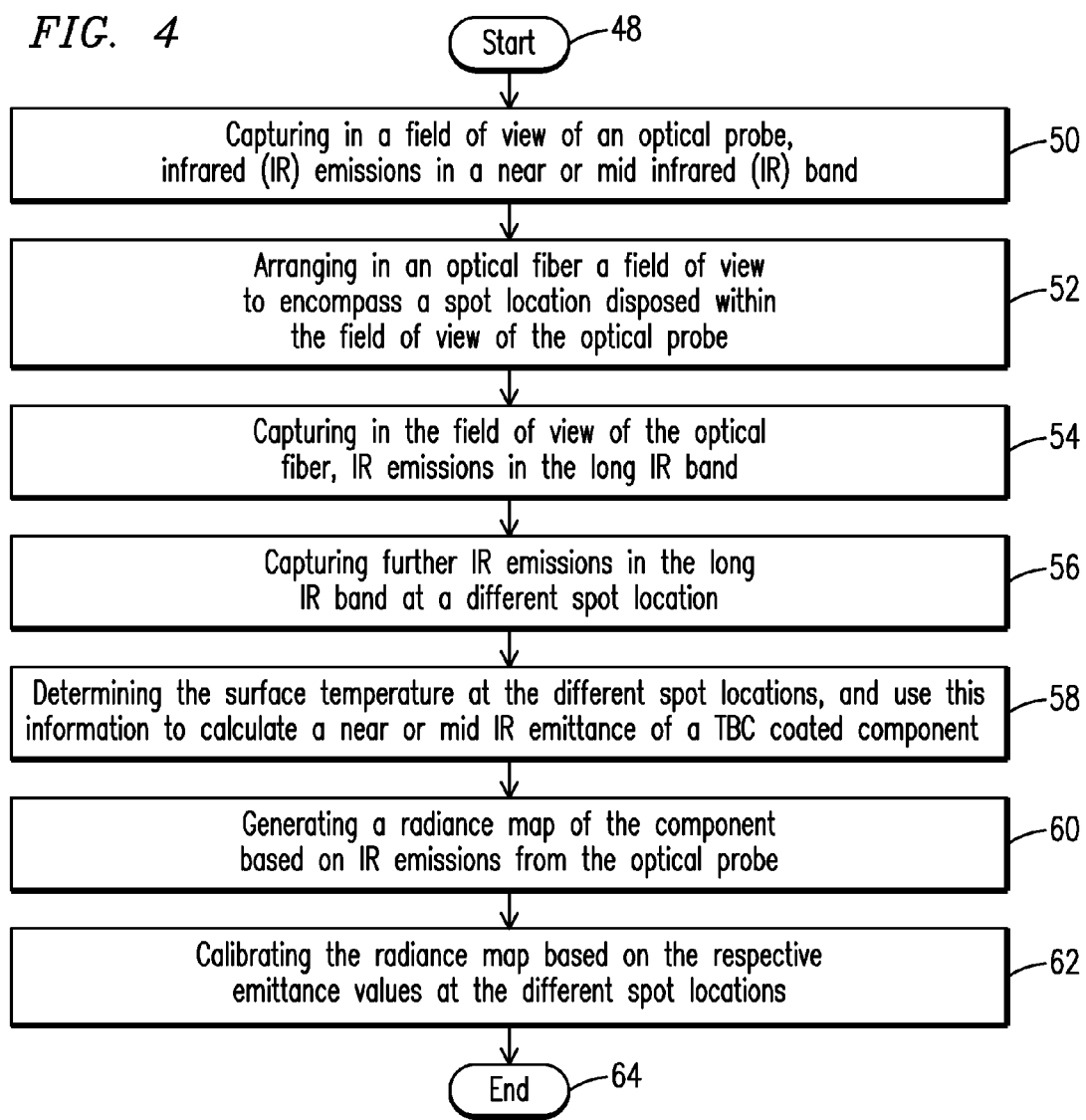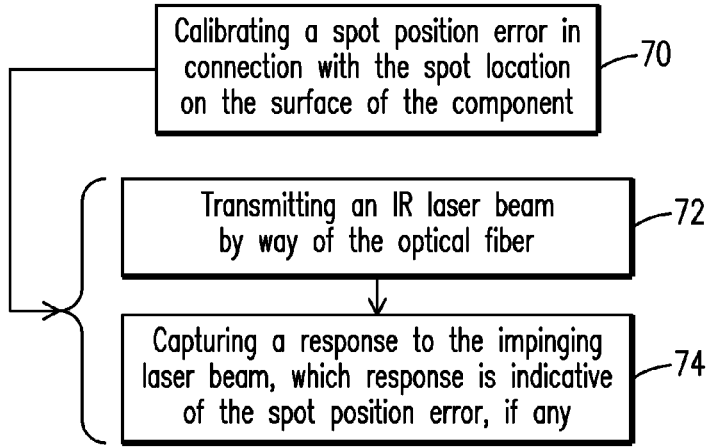

DUAL INFRARED BAND APPARATUS AND METHOD FOR THERMALLY MAPPING A COMPONENT IN A HIGH TEMPERATURE COMBUSTION ENVIRONMENT

FIELD OF THE INVENTION

The present invention is generally related to infrared (IR) thermography, and, more particularly, to dual IR band apparatus and methodology for thermally mapping a component in a high temperature combustion environment, such as in a turbine engine.

BACKGROUND OF THE INVENTION

It is known to use various superalloy materials, such as cobalt or nickel-based superalloys, for making blades, vanes and other components for power generating turbine engines, propulsion equipment, etc. These turbine engines can operate at relatively high temperatures and are generally protected by a series of protective coatings. The coatings may comprise layers of metallic base coats, thermally grown oxide layers, as such layers grow in service-run components and a final ceramic thermal barrier coating (TBC). Long-term exposure of these ceramic coatings to the hostile, high temperature, abrasive environment in which such turbine engines typically operate can cause phase destabilization, sintering, microcracking, delamination and ultimately spallation within the coating layers, exposing the superalloy component and possibly resulting in rapid degradation or failure and potentially requiring costly and burdensome repairs.

U.S. Pat. No. 7,690,840 titled "Method And Apparatus For Measuring On-Line Failure Of Turbine Thermal Barrier Coatings" describes an IR imaging apparatus configured to non-destructively measure the radiance of a rotating turbine component (e.g., a blade) in a turbine engine in the context of monitoring the formation and progression of TBC defects, where images of relative high spatial resolution are needed but where accurate absolute temperature information may not be needed. The foregoing patent is commonly assigned to the assignee of the present invention and herein incorporated by reference in its entirety.

BRIEF DESCRIPTION OF THE DRAWINGS

The invention is explained in the following description in view of the drawings that show:

FIG. 4 is a flow chart of a method embodying aspects of the present invention.

FIG. 5 is a flow chart of a method embodying further aspects of the present invention as may be used to calibrate a spot position error.

DETAILED DESCRIPTION OF THE INVENTION

Figure 1:
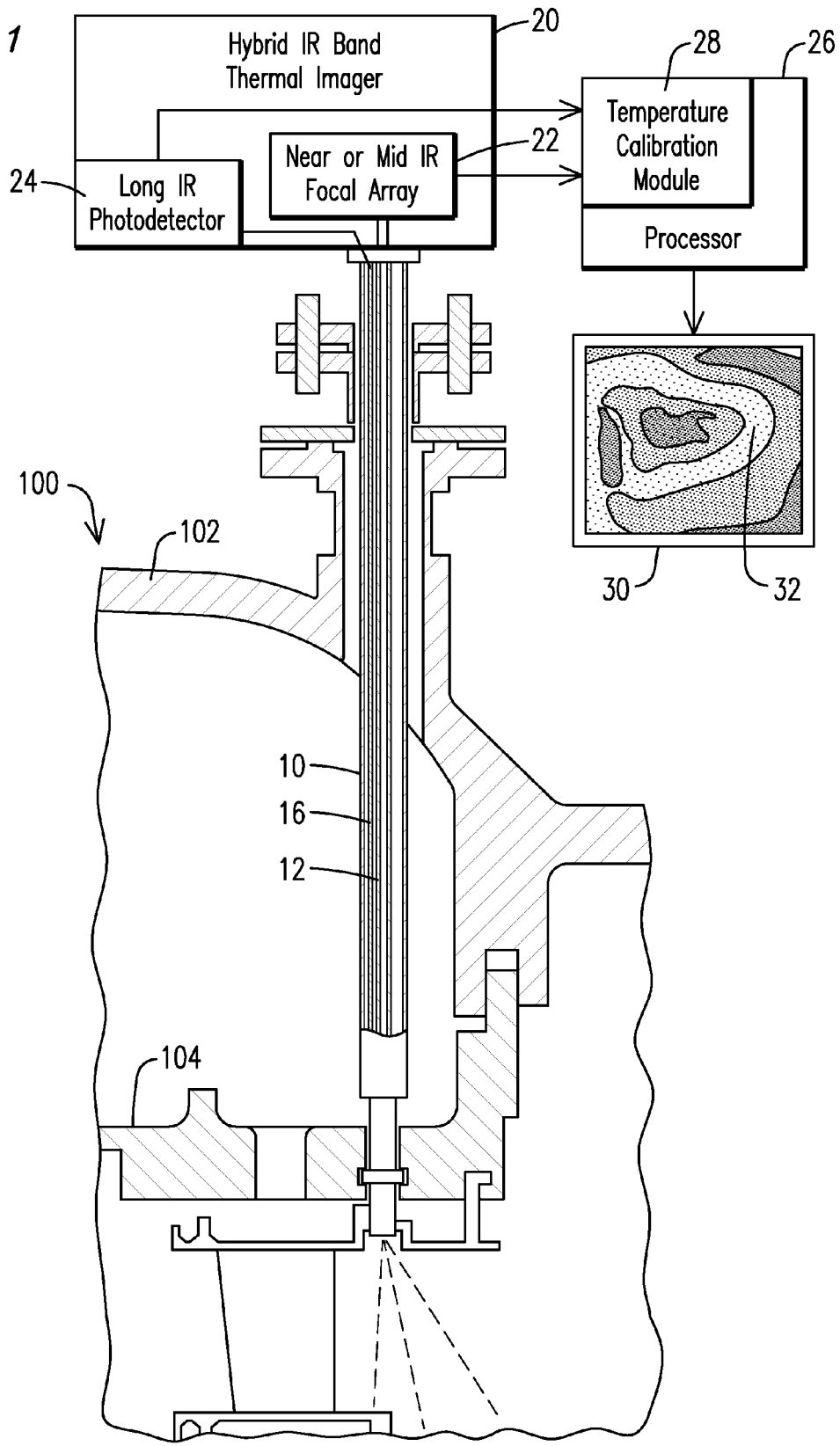
FIG. 1 is a schematic representation of an apparatus embodying aspects of the present invention.

The present inventors have recognized certain opportunities and certain challenges in connection with known infrared (IR) imaging apparatuses. For example, one known IR imaging apparatus is designed to operate in the near IR band of the IR spectrum. This IR band is suitable for measuring surface temperature of components comprising relatively high emittance values (such as metal blade components, etc.) but not the surface temperature of components having a ceramic thermal barrier coating (TBC), which comprises relatively low emittance values in the near or mid IR band. By way of comparison, the ceramic TBC comprises emittance values close to unity in the long IR band of the IR spectrum. Accordingly, detection of IR emissions in the long IR band can provide substantially more accurate temperature measurement in components involving TBCs. However, it has been challenging to find suitable optical materials for capturing emissions in the long IR band, (e.g., optical materials having appropriate transmissivity properties in the long IR band) and that can also operate in a hostile turbine engine environment with the same robustness as the near or mid IR materials do.

In view of their recognition, the present inventors propose an innovative dual (hybrid) IR band apparatus involving a non-imaging long wave IR optical fiber with a near or mid IR imaging device. This hybrid band design synergistically exploits the advantages associated with the relatively high spatial resolution and robustness of a near or mid IR imaging apparatus with the temperature accuracy of a long wave IR measurement, while skillfully avoiding the concomitant challenges discussed above. In one non-limiting application, the proposed apparatus is useful for mapping absolute temperature of a surface in a component comprising a TBC. That is, a TBC coated component.

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent unless otherwise so described. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

FIG. 1 is a schematic representation of an apparatus embodying aspects of the present invention. In one non-limiting application, the apparatus may be used for thermally mapping a component in a turbine engine 100 during operation of turbine engine 100. In one non-limiting embodiment, the apparatus may include a viewing tube 10 mounted onto turbine engine 100 and positioned to extend between a radially outer casing wall 102 and in an inner casing wall 104 located radially inwardly from the outer casing wall 104.

Figure 2:
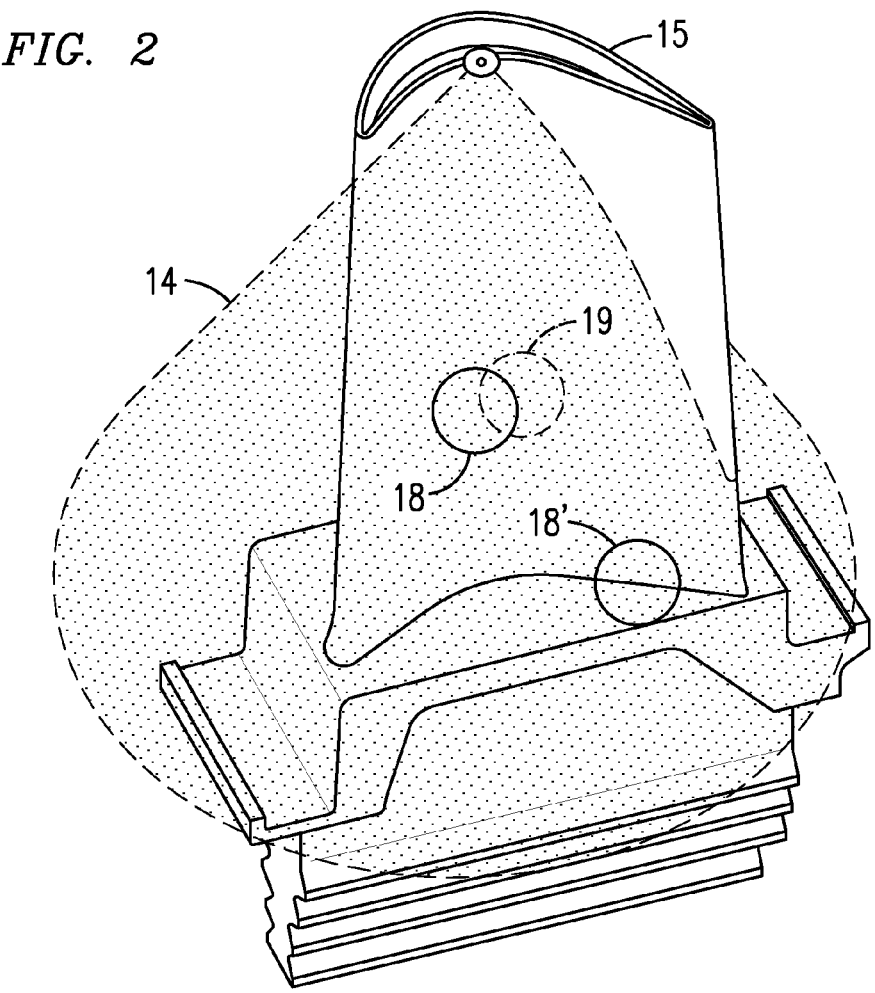
FIG. 2 is an isometric view for conceptualizing an example field of view that may be obtained with a near or mid infrared (IR) optical probe and a spot location that may be viewed with a long IR optical fiber.

In one non-limiting embodiment, an imaging optical probe 12 may be housed in viewing tube 10. Optical probe 12 has a field of view 14 (FIG. 2) arranged to fully encompass a surface of a component 15, e.g., a rotatable blade, to be thermally mapped in a high temperature combustion environment of turbine engine 100. Optical probe 12 is effective to concurrently capture infrared (IR) emissions that fully encompass the surface of component 15. The IR emissions comprising a first IR band in an IR spectrum. In one non-limiting embodiment, this first IR band may be a near IR wavelength band comprising a range from approximately 1 µm to approximately 2 µm. In another non-limiting embodiment, in lieu of the near IR wavelength band, one can use a mid IR band in a range from approximately 3 µm to approximately 5 µm.

As noted above, the IR emissions in the first IR band may be susceptible to emittance attenuation at the surface of the component in the combustion environment of the turbine engine. In one non-limiting embodiment, optical probe 12 may comprise at least one optical lens 13 (FIG. 3) having appropriate transmissivity properties in the near IR or the mid IR band. Non-limiting examples of optical materials that may be used for optical elements in optical probe 12, such as lenses, mirrors, etc., may include fused silica (near IR), sapphire, alon optical ceramic, spinel optical ceramic (mid and near IR), ZnS, Ge, or gold coated mirrors, molybdenum mirrors, etc.

In one non-limiting embodiment, an optical fiber 16 may be housed in viewing tube 10. A field of view of optical fiber 16 may be arranged to encompass a spot location 18 (FIG. 2) on the surface of component 15 disposed within the field of view 14 of optical probe 10. Optical fiber 16 is effective to capture IR emissions comprising a second IR band in the IR spectrum. The IR emissions in the second IR band are indicative of an emittance value at the spot location 18 on the surface of the component, such as a TBC coated component. In one non-limiting embodiment, this second band in the IR spectrum may be a long IR wavelength in a range from approximately 8 µm to approximately 12 µm. This band may be specially tailored to reduce effects of hot gas absorption. For instance, a relatively narrow spectral band in a range from approximately 10 µm to approximately 10.3 µm has been shown to be outside any significant gas absorption. Non-limiting examples of optical fiber 16 may include hollow metal waveguides, such as may comprise silver dad layers, dielectrically coated photonic bandgap fibers, hollow sapphire fibers, polycrystalline AgCl, AgBr solid fibers, etc.

In one non-limiting embodiment, a thermal imager 20 including a near IR focal array 22, such as a charged coupled device (CCD) array or digital IR camera, is coupled to sense the IR emissions captured by optical probe 12. Thermal imager 20 may further include a photodetector 24 coupled to sense the IR emissions captured by optical fiber 16.

In one non-limiting embodiment, a processor 26 is connected to thermal imager 20 to generate a radiance map of the component based on the IR emissions from optical probe 12. Processor 26 includes a temperature calibration module 28 configured to calibrate the radiance map based on the value of the emittance at the spot location. A monitor 30 may be used to display a calibrated radiance map 32 effective to map the absolute temperature of the component.

In one non-limiting embodiment, a further optical fiber 16' (FIG. 3) may be optionally housed in viewing tube 10 to encompass a further spot location 18' (FIG. 2) at a different location on the surface of component 15. The further spot location is disposed within the field of view 14 of optical probe 12. Further optical fiber 16' is effective to capture further IR emissions in the second band of the IR spectrum. The further IR emissions are indicative of an emittance value at the further spot location 18' on the surface of the component.

In one non-limiting embodiment, such as where the component of the turbine engine comprises a TBC subject to emittance variation in the combustion environment of the turbine engine, temperature calibration module 28 may be configured to calibrate the radiance map based on the respective emittance values at the different spot locations 18, 18' and thus reduce a temperature error effect due to the emittance variation of the TBC. For example, the emittance variation may take different values throughout the surface of the component depending on varying degrees of degradation of the TBC and/or depending on varying degrees of soot contamination throughout the surface of the component.

In another non-limiting embodiment, such as where the component of the turbine engine may comprise a thermally cooled component subject to thermal gradients, temperature calibration module 28 may be configured to calibrate the radiance map based on the respective emittance values at the different spot locations 18, 18' and thus reduce a temperature error effect due to the thermal gradients.

FIG. 4 is a flow chart of a method embodying aspects of the present invention. In one non-limiting embodiment, subsequent to start step 48, step 50 allows capturing in a field of view 14 (FIG. 2) of an optical probe (e.g., optical probe 12 (FIG. 1)) infrared (IR) emissions from a surface of a component to be thermally mapped in a high temperature combustion environment of a turbine engine. The IR emissions comprise a first IR band, such as a near or mid IR wavelength band, in an IR spectrum. Step 52 allows arranging in an optical fiber (e.g., optical fiber 16 (FIG. 1) a field of view to encompass a spot location 18 (FIG. 2) on the surface of the component. The spot location is disposed within the field of view of the optical probe. Step 54 allows capturing in the field of view of the optical fiber, IR emissions comprising a second IR band, such as a long IR wavelength band. The IR emissions in the second IR band of the IR spectrum may be indicative of an emittance value at the spot location on the surface of the component.

In one non-limiting embodiment one may optionally proceed as follows: step 56 allows capturing further IR emissions in the long IR wavelength band of the IR spectrum. The further IR emissions may be indicative of an emittance value at a different spot location 18' (FIG. 2), such as on the surface of a TBC coated component. Step 58 allows determining the surface temperature of the TBC coated component at the various spot locations, as may be measured with one or more long IR detectors (e.g., photodetector 24 (FIG. 1)). These temperature measurements may be used to calculate a near or mid IR emittance of the TBC coated component.

Step 60 allows generating a radiance map of the component based on the IR emissions in the near or mid IR band from the optical probe. Prior to end step 64, step 62 allows calibrating the radiance map based on the respective emittance values at the different spot locations 18, 18'. In one non-limiting embodiment, such as where the component of the turbine engine comprises a TBC subject to emittance variation in the combustion environment of the turbine engine, this may allow to reduce a temperature error effect due to the emittance variation of the TBC. In another non-limiting embodiment, such as where the component of the turbine engine may comprise a thermally cooled component subject to thermal gradients, this may allow to reduce a temperature error effect due to the thermal gradients.

In yet another aspect of the present invention, step 70 allows calibrating a spot position error that may develop in connection with the spot location detected by the long IR optical fiber. For example, spot location 18 (FIG. 2) may be the location intended during the design of the apparatus, but not necessarily the actual spot location realized subsequent to installation of the apparatus onto the turbine. For example, as would be appreciated by those skilled in the art, in a real world application, due to manufacturing and/or installation alignment tolerances present in connection with the elements housed in the viewing tube, let us presume a certain spot position error is introduced.

Figure 3:
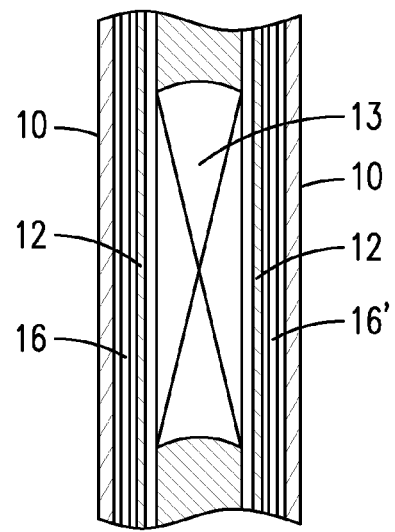
FIG. 3 is a fragmentary cross sectional view illustrating non-limiting structural details regarding an apparatus embodying aspects of the present invention.

In one non-limiting embodiment, the calibrating of the spot position error may be performed as follows: step 72 allows transmitting an IR laser beam by way of the optical fiber. This laser beam impinges on the surface of the component on a laser-radiated location expected to correspond with spot location 18. However, because of the introduced spot position error, let us presume the laser beam actually impinges at spot location 19 (FIG. 3, represented by a dashed circle). In this case, step 74 allows capturing with the optical probe, IR emissions comprising a response to the impinging laser beam, and this response may be processed to indicate the spot position error in connection with the spot location.

In one non-limiting embodiment, it is contemplated that an apparatus embodying aspects of the present invention may be implemented without a need of active cooling for the portion of the apparatus (e.g., the portion of the viewing tube) within the pressurized environment of the turbine engine, such as spaces encased by outer casing wall 102 and/or inner casing wall 104. This may be feasible in long term applications, where calibration of the near or mid IR emittance values need not be performed for every measurement. It will be appreciated that depending on the needs of a given application, active cooling may be used to cool the long IR optical fiber during the relatively short period of time that may be needed to acquire the emittance value at a given spot location. This aspect is conducive to a more practical apparatus with increased operational versatility, such as may be effective for deployment at remote power plant sites.

In operation, the proposed combination of near or mid IR imaging with a long wave IR non-imaging optical fiber measurement without limitation provides at least the following example advantages: high spatial imaging resolution, accurate absolute temperature measurement on both metal and TBC components, and robust apparatus for reliable online monitoring of components in a high temperature combustion environment of a turbine engine.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus comprising:
  an optical imaging probe housed in a viewing tube, the optical imaging probe having a field of view arranged to fully encompass a surface of a component to be thermally mapped in a high temperature combustion environment of a turbine engine, the imaging optical probe effective to concurrently capture infrared (IR) emissions that fully encompass the surface of a component, the IR emissions comprising a first band in an IR spectrum, wherein the first band in the IR spectrum comprises a near IR wavelength or comprises a mid IR wavelength, wherein the component of the turbine engine comprises a thermal barrier coating (TBC) subject to emittance variation in the combustion environment of the turbine engine;
  an optical fiber housed in the viewing tube, a field of view of the optical fiber arranged to encompass a spot location on the surface of the component disposed within the field of view of the optical probe, the optical fiber effective to capture IR emissions comprising a second band in the IR spectrum, wherein the second band in the IR spectrum comprises a long IR wavelength effective to measure with a higher degree of accuracy emittance values from the TBC than the wavelengths in the first band, the IR emissions in the second band in the IR spectrum indicative of an emittance value of the TBC at the spot location on the surface of the component effective to reduce temperature errors due to the emittance variation of the TBC; and
  a processor configured to calibrate a spot position error in connection with the spot location on the surface of the component by way of an IR laser beam transmitted through the optical fiber,
  wherein the laser beam impinges on the surface of the component on a laser-radiated location expected to correspond with the spot location, and
  wherein the optical probe is configured to capture IR emissions comprising a response to the impinging laser beam, the response indicative of the spot position error in connection with the spot location.

2. The apparatus of claim 1, wherein the near IR wavelength is in a range from approximately 1 μm to approximately 2 μm and the mid IR wavelength is in a range from approximately 3 μm to approximately 5 μm, and the long IR wavelength is in a range from approximately 8 μm to approximately 12 μm.

3. The apparatus of claim 2, wherein the range for the long IR wavelength is from approximately 10 μm to approximately 10.3 μm.

4. The apparatus of claim 1, further comprising a thermal imager comprising a focal array coupled to sense the IR emissions captured by the optical probe, and further comprising a photodetector coupled to sense the IR emissions captured by the optical fiber.

5. The apparatus of claim 4, wherein the processor is connected to the thermal imager to generate a radiance map of the component based on the IR emissions from the optical probe, the processor including a temperature calibration module to calibrate the radiance map based on the value of the emittance at the spot location.

6. The apparatus of claim 1, wherein the apparatus further comprises:
  a further optical fiber housed in the viewing tube to encompass a further spot location at a different location on the surface of the component, the further spot disposed within the field of view of the optical probe, the further optical fiber effective to capture further IR emissions in the second band of the IR spectrum, the further IR emissions indicative of an emittance value at the further spot location on the surface of the component;
  wherein the processor is connected to the thermal imager to generate a radiance map of the component based on the IR emissions from the optical probe, the processor including a temperature calibration module configured to calibrate the radiance map based on the respective emittance values at the different spot locations and thus reduce a temperature error effect due to the emittance variation of the TBC coated component.

7. The apparatus of claim 1, wherein the optical probe comprises at least one optical lens.

8. The apparatus of claim 1, wherein the optical fiber comprises an optical fiber selected from the group consisting of a hollow metal waveguide, a hollow sapphire fiber, a dielectrically coated photonic bandgap fiber, and a polycrystalline solid fiber.

9. An apparatus comprising:
an optical imaging probe comprising at least one optical lens and having a field of view arranged to fully encompass a surface of a component to be thermally mapped in a high temperature combustion environment of a turbine engine, wherein the component of the turbine engine comprises a thermal barrier coating (TBC) subject to emittance variation in the combustion environment of the turbine engine, the imaging optical probe effective to concurrently capture infra-red (IR) emissions that fully encompass the surface of a component, the IR emissions comprising a first band in an IR spectrum, wherein the first band in the IR spectrum comprises a near IR wavelength in a range from approximately 1 µm to approximately 2 µm, or comprises a mid IR wavelength in a range from approximately 3 µm to approximately 5 µm;
an optical fiber having a field of view arranged to encompass a spot location on the surface of the component disposed within the field of view of the optical probe, the optical fiber effective to capture IR emissions comprising a second band in the IR spectrum, the IR emissions in the second band in the IR spectrum indicative of an emittance value at the spot location on the surface of the component, wherein the second band in the IR spectrum comprises a long IR wavelength in a range from approximately 8 µm to approximately 12 µm, wherein the long IR wavelength is effective to measure with a higher degree of accuracy emittance values from the TBC than the wavelengths in the first band; and
a processor configured to generate a radiance map of the component based on the IR emissions from the optical probe, the processor including a temperature calibration module to calibrate the radiance map based on the emittance value of the TBC at the spot location and thus reduce temperature errors due to the emittance variation of the TBC;
wherein the processor is configured to calibrate a spot position error in connection with the spot location on the surface of the component by way of an IR laser beam transmitted through the optical fiber
wherein the laser beam impinges on the surface of the component on a laser-radiated location expected to correspond with the spot location, and
wherein the optical probe is configured to capture IR emissions comprising a response to the impinging laser beam, the response indicative of the spot position error in connection with the spot location.

10. The apparatus of claim 9, wherein the range for the long IR wavelength is from approximately 10 µm to approximately 10.3 µm.

11. A method comprising:
capturing in a field of view of an optical probe, infrared (IR) emissions from a surface of a component to be thermally mapped in a high temperature combustion environment of a turbine engine, wherein the component of the turbine engine comprises a thermal barrier coating (TBC) subject to emittance variation in the combustion environment of the turbine engine, the IR emissions comprising a first band in an IR spectrum, wherein the first band in the IR spectrum comprises a near IR wavelength or comprises a mid IR wavelength;
arranging in an optical fiber a field of view to encompass a spot location on the surface of the component, the spot location disposed within the field of view of the optical probe;
capturing in the field of view of the optical fiber, IR emissions comprising a second band in the IR spectrum, wherein the second band in the IR spectrum comprises a long IR wavelength effective to measure with a higher degree of accuracy emittance values from the TBC than the wavelengths in the first band, the IR emissions in the second band of the IR spectrum indicative of an emittance value of the TBC at the spot location on the surface of the component effective to reduce temperature errors due to the emittance variation of the TBC; and
calibrating a spot position error in connection with the spot location on the surface of the component, wherein the calibrating comprises:
transmitting an IR laser beam by way of the optical fiber, the laser beam impinging on the surface of the component on a laser-radiated location expected to correspond with the spot location; and
capturing with the optical probe, IR emissions comprising a response to the impinging laser beam, the response indicative of the spot position error in connection with the spot location.

12. The method of claim 11, wherein the near IR wavelength is in a range from approximately 1 µm to approximately 2 µm, and the mid IR wavelength is in a range from approximately 3 µm to approximately 5 µm, and the long IR wavelength is in a range from approximately 8 µm to approximately 12 µm.

13. The method of claim 12, wherein the range for the long IR wavelength is from approximately 10 µm to approximately 10.3 µm.

14. The method of claim 11, further comprising coupling a focal array to sense the IR emissions captured by the optical probe, and further coupling a photodetector to sense the IR emissions captured by the optical fiber.

15. The method of claim 11, generating a radiance map of the component based on the sensed IR emissions from the optical probe, and calibrating the radiance map based on the value of the emittance measurement for the spot.

16. The method of claim 11, wherein the component of the turbine engine comprises a component comprising a thermal barrier coating (TBC) subject to emittance variation in the combustion environment of the turbine engine, the method further comprising:
capturing further IR emissions in the second band of the IR spectrum, the further IR emissions indicative of an emittance value at a different spot location on the surface of the component;
generating a radiance map of the component based on the IR emissions from the optical probe; and
calibrating the radiance map based on the respective emittance values at the different spot locations and thus reduce a temperature error effect due to the emittance variation of the TBC coated component.

17. The method of claim 11, wherein the component of the turbine engine comprises a thermally cooled component subject to thermal gradients, the method further comprising:
capturing further IR emissions in the second band of the IR spectrum, the further IR emissions indicative of an emittance value at a different spot location on the surface of the component;
generating a radiance map of the component based on the IR emissions from the optical probe; and
calibrating the radiance map based on the respective emittance values at the different spot locations and thus reduce a temperature error effect due to the thermal gradients.

18. The method of claim 11, wherein the capturing of IR emissions in the first band of the IR spectrum is performed without active cooling of at least a portion of the apparatus disposed within a pressurized environment of the turbine engine.

\* \* \* \* \*